United States Patent [19]
Fujita et al.

[11] Patent Number: 5,798,628
[45] Date of Patent: Aug. 25, 1998

[54] INVERTER CONTROL SYSTEM WHICH DYNAMICALLY VARIES A VOLTAGE VECTOR APPLIED TO THE INVERTER BASED ON PRIMARY FLUX AND TORQUE DEVIATIONS

[75] Inventors: Hiroshi Fujita; Kazuyoshi Obayashi, both of Kariya, Japan

[73] Assignee: Nippondenso Co., Ltd., Kariya, Japan

[21] Appl. No.: 659,887

[22] Filed: Jun. 7, 1996

[30] Foreign Application Priority Data

Jun. 8, 1995 [JP] Japan .................. 7-142224
Jan. 30, 1996 [JP] Japan .................. 8-014287

[51] Int. Cl.$^6$ ........................................ H02P 5/28
[52] U.S. Cl. ................ 318/805; 318/808; 318/809; 318/810
[58] Field of Search ........................ 318/798–812

[56] References Cited

U.S. PATENT DOCUMENTS

| | | | |
|---|---|---|---|
| 5,023,538 | 6/1991 | Mutoh et al. | 318/811 |
| 5,166,593 | 11/1992 | Doncker et al. | 318/800 |
| 5,225,712 | 7/1993 | Erdman | 290/44 |
| 5,298,848 | 3/1994 | Ueda et al. | 318/811 |
| 5,341,081 | 8/1994 | Yamada | 318/800 |
| 5,365,158 | 11/1994 | Tanaka et al. | 318/806 |

FOREIGN PATENT DOCUMENTS

| | | |
|---|---|---|
| 63-290192 | 11/1988 | Japan . |
| 2-193587 | 7/1990 | Japan . |
| 6-26079 | 7/1994 | Japan . |
| 6-351292 | 12/1994 | Japan . |

OTHER PUBLICATIONS

Institute of Electrical Engineers of Japan, vol.B–10 6 No. 1. A Novel High–Response Torque control system for Induction Motors Based on the Instantaneous Slip Frequency Control. Takahashi et al. See Appln. p. 1, Jan. 1986.

Primary Examiner—Brian Sircus
Attorney, Agent, or Firm—Cushman Darby & Cushman IP Group of Pillsbury Madison & Sutro LLP

[57] ABSTRACT

An inverter control system for operating an induction motor calculates the primary magnetic flux vector and instantaneous torque value from the primary terminal voltage and primary current of the motor and produces a voltage vector to be delivered to the PWM inverter depending on the deviations of primary flux vector and instantaneous torque value from their command values and the phase angle of primary flux vector, with the switching of voltage vector being controlled so that the PWM inverter operates in a prescribed range of switching frequency irrespective of the period of calculation of the primary flux vector and instantaneous torque value. Setting the upper limit of switching frequency reduces the heat generation of the PWM inverter, allowing it to suffice with a smaller cooling device, and setting the lower limit of switching frequency reduces the magnetic noise and torque fluctuation of the motor.

19 Claims, 15 Drawing Sheets

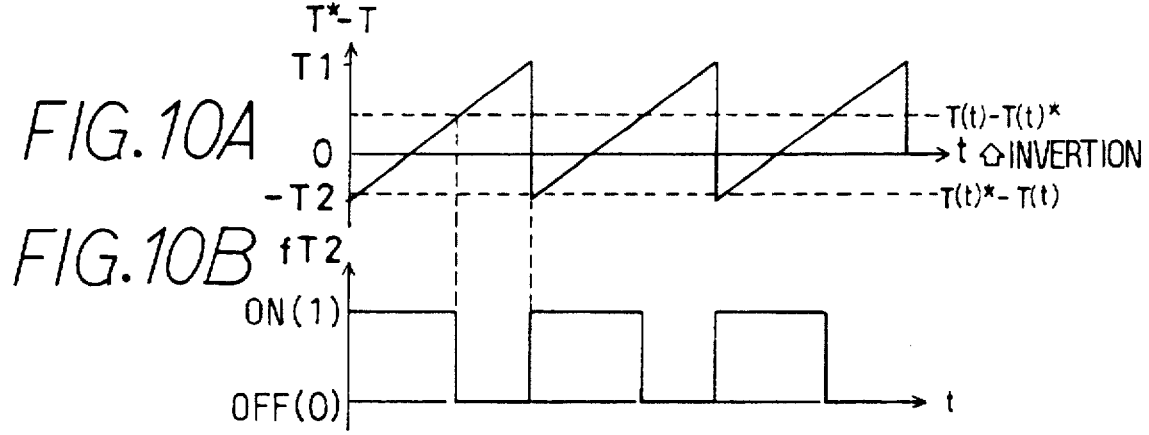
FIG.10A
FIG.10B
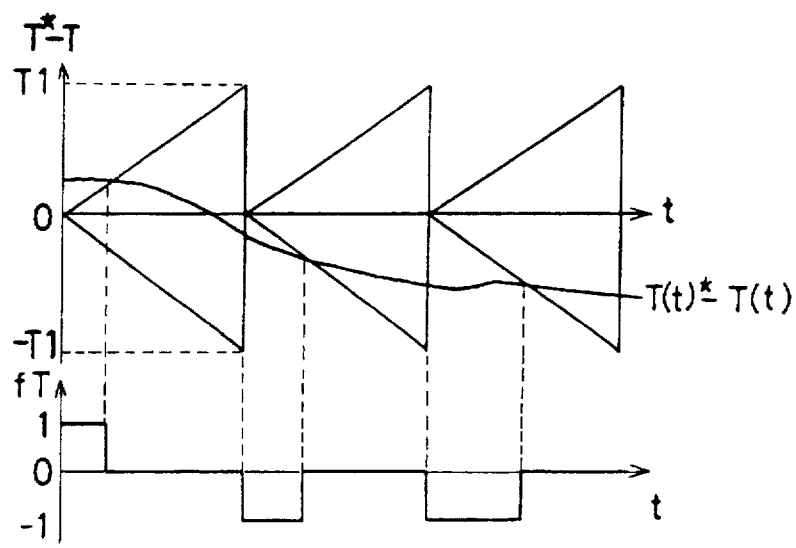
FIG.11A
FIG.11B

FIG. 12
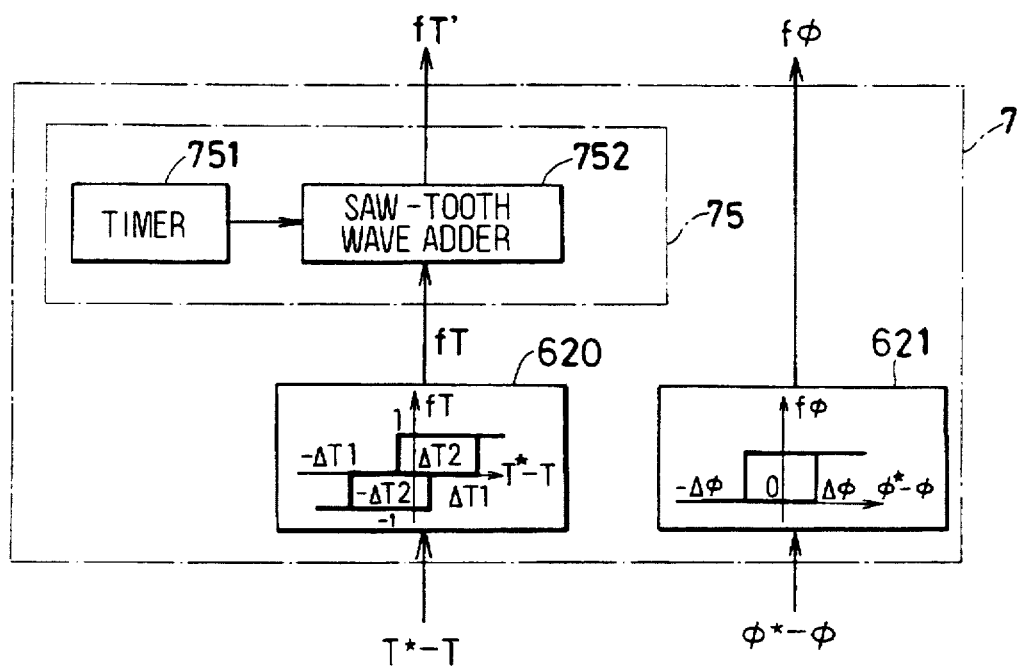
FIG.13A
FIG.13B
FIG.13C
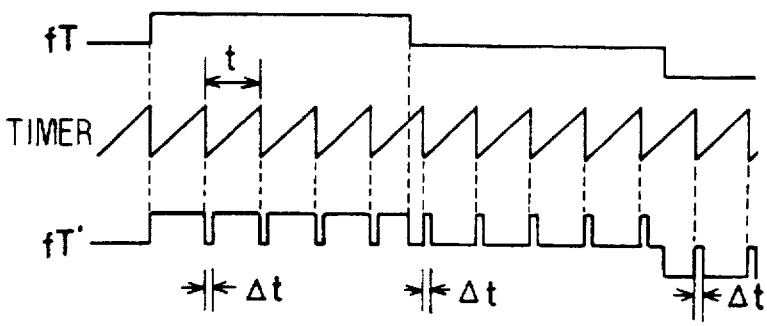

# 5,798,628

INVERTER CONTROL SYSTEM WHICH DYNAMICALLY VARIES A VOLTAGE VECTOR APPLIED TO THE INVERTER BASED ON PRIMARY FLUX AND TORQUE DEVIATIONS

CROSS REFERENCE TO RELATED APPLICATION

The present application is based on and claims priority from Japanese Patent Applications, No. Hei 7-142224, filed on Jun. 8, 1995, and No. Hei 8-14287, filed on Jan. 30, 1996, the contents of which are incorporated herein by reference.

BACKGROUND OF THE INVENTION

1. Field of the Invention

The present invention relates to an inverter control system which implements the torque control of an induction motor by controlling the voltage vector of a PWM inverter. Particularly, the invention relates to an inverter control system which manipulates the switching frequency of the inverter to reside in an intended frequency band so as to reduce the magnetic noise of the motor, and to an inverter control system which enables an enhanced torque response to be provided by the motor.

2. Description of the Related Art

A high-response torque control system for operating an induction motor is proposed in the article of the magazine of The Institute of Electrical Engineers of Japan, Vol. B-106, No. 1, p. 9, entitled "A Novel High-Response Torque Control System for Induction Motors Based on the Instantaneous Slip Frequency Control".

FIG. 17 is a block diagram explaining the torque control system described in the above-mentioned publication. The system includes a battery 1, a battery voltage detector 2, a PWM inverter 3 which operates as three double-pole switches and is made up of switching elements, e.g., transistors, and diodes in antiparallel connection on six arms, current detectors 4, a 3-phase induction motor 5, and an inverter control circuit 6.

The inverter control circuit 6 includes a block 601 which converts the primary current vector of 3-phase currents iu, iv and iw detected by the current detectors 4 into axial components i1$d$ and i1$q$ of two axes d and q, a block 602 which calculates the unit vector of the primary terminal voltage based on the switching states (Su, Sv and Sw) in the inverter control circuit 3, and blocks 603 and 604 which calculate the axial components V1$d$ and V1$q$ of the primary terminal voltage vector by multiplying the battery voltage detected by the voltage detector 2 to the unit vector.

Further included are blocks 605 and 606 which multiply the resistance value R1 of the primary winding of the induction motor 5 to the axial components i1$d$ and i1$q$ of the primary current vector of the 3-phase current thereby to evaluate the voltage value, blocks 607 and 608 which subtract the voltage value provided by the blocks 605 and 606 from the axial components V1$d$ and V1$q$ of the primary terminal voltage provided by the blocks 603 and 604, and blocks 609 and 610 which calculate the axial components $\phi$1$d$ and $\phi$1$q$ of the primary magnetic flux vector through the integral operation for the voltage value provided by the blocks 607 and 608.

Further included are a block 611 which calculates the length $\phi$1 of the primary flux vector from the axial components $\phi$1$d$ and $\phi$1$q$ of the primary flux vector, a block 612 which evaluates the primary flux error $\Delta\phi$ by subtracting the primary flux vector length $\phi$1 from the primary flux command value $\phi$1*, blocks 613 and 614 which evaluate the axial components of instantaneous torque T through the multiplying operation between the axial components i1$d$ and i1$q$ of primary current vector provided by the block 601 and the axial components $\phi$1$d$ and $\phi$1$q$ of the primary flux vector provided by the blocks 609 and 610, a block 615 which evaluates the instantaneous torque T from its axial components provided by the blocks 613 and 614, and a block 616 which evaluates the torque error $\Delta$T by subtracting the instantaneous torque T from the torque command T*.

Further included is a 3-value hysteresis comparator 620 which produces the torque retention command if the torque error $\Delta$T which is evaluated by the block 616 and is the difference of the instantaneous torque T, i.e., a vector product of the primary flux vector and the motor current, from the torque command T* is within a prescribed range, or produces the torque-increase command or torque-decrease command if the torque error $\Delta$T is outside the range. Further included is a 2-value hysteresis comparator 621 which produces a primary flux flag f$\phi$ depending on the primary flux error $\Delta\phi$ provided by the block 612, i.e., the f$\phi$ is the primary flux decrease command if the primary flux vector length $\phi$1 calculated by the block 611 is greater than the primary flux command value $\phi$1*, or it is the primary flux increase command if $\phi$1 is smaller than $\phi$1*. Further included is a block 622 which discriminates the phase angle $\theta$ of the primary flux vector in terms of one of six sections bordered at 30°, 90°, 150°, 210°, 270° and 330° measured clockwise from the d-axis as shown in FIG. 18, and produces a phase flag f$\theta$ indicative of the determined section.

Further included is a switching table 623 stored in a ROM, and it is a record of optimized voltage vectors derived from the torque response. The table stores switching patterns of the PWM inverter 3 for accomplishing the optimal voltage vector as shown in Table A, and it reads out a switching pattern in response to a given combination of a torque flag fT, primary flux flag f$\phi$ and phase flag f$\theta$.

Numeric values which represent switching patterns in Table A indicate the directions of voltage vectors shown in FIG. 19.

TABLE A

| f$\phi$ | fT | \multicolumn{6}{c}{f$\theta$} |
|---|---|---|---|---|---|---|---|
|   |    | (1) | (2) | (3) | (4) | (5) | (6) |
| 1  | 1  | 2 | 3 | 4 | 5 | 6 | 1 |
|    | 0  | 7 | 0 | 7 | 0 | 7 | 0 |
|    | -1 | 6 | 1 | 2 | 3 | 4 | 5 |
| -1 | 1  | 3 | 3 | 4 | 6 | 1 | 2 |
|    | 0  | 0 | 7 | 0 | 7 | 0 | 7 |
|    | -1 | 5 | 6 | 1 | 2 | 3 | 4 |

Based on the foregoing arrangement, the inverter control circuit 6 calculates instantaneous torque, the primary flux vector and a pulse angle of the primary flux vector from the voltage vector read out of the switching table 623, the battery voltage, the motor current and the motor primary winding resistance, determines a switching pattern at each moment based on the instantaneous torque, the primary flux vector and a phase angle of the primary flux vector, and delivers the switching pattern to the PWM inverter 3.

Japanese Utility Model Publication No. Hei 6-26079 discloses a scheme of reducing the motor output shock when starting or changing speed by the additional provision of a means of converting the torque command value into a pulse train having an amplitude equal to the hysteresis value in the case of a torque command smaller than the hysteresis value of the hysteresis comparator which causes the primary flux vector to move or stop so that the output torque follows the torque command within a certain range of deviation.

The foregoing prior art is designed to read out a record of the voltage vector from the ROM in response to the immediate control flags (torque flag, primary flux flag and phase flag), and the PWM inverter has its switching interval, i.e., switching frequency, depending on the calculation of each block. Consequently, when the PWM inverter operates at a lower switching frequency, for example, the primary winding current of the motor includes many audible frequency components creating the audible magnetic noise, creates a torque fluctuation due to an increased distortion of the motor current, and produces an unexpected large motor current which can activate the over-current protector of the inverter.

Another problem is that the mean value of the instantaneous torque decreases relative to the torque command value with the increase in the motor speed due to the influence of the counter-electromotive force of the motor.

The control system of the above-mentioned Utility Model publication is designed to have the operation of pulse width modulation only when the torque command value is smaller than the hysteresis value of the hysteresis comparator, and it cannot solve these problems.

SUMMARY OF THE INVENTION

An object of the present invention is to provide a simple and compact inverter control system which is operative to set an intended inverter switching frequency range and capable of alleviating the magnetic noise and torque fluctuation.

Another object of the present invention is to provide an inverter control system for operating a multi-phase induction motor comprising: means for detecting primary terminal voltage applied to the motor; means for detecting primary current flowing through the motor; means for calculating a primary flux vector from the primary terminal voltage and the primary current; means for calculating an instantaneous torque value from the primary terminal voltage and the primary current; means for producing a voltage vector of the inverter based on a flux deviation of the primary flux vector from the primary flux command value, the torque deviation of the instantaneous torque value from the torque command value, and a phase angle of the primary flux vector; and means for converting the voltage vector into a different voltage vector at a prescribed first time interval.

Consequently, it is possible for the inverter to limit the switching frequency so as to reduce the heat generation thereby to suffice with a smaller inverter cooling device, and it is also possible for the inverter to raise the switching frequency by altering the voltage vector at a prescribed time interval so as to set the lower limit of the switching frequency thereby to prevent the emergence of magnetic noise and torque fluctuation.

Preferably, the different voltage vector produced by the voltage vector control means is a zero voltage vector that causes all phase voltages of the motor to be 0 volts; time of the different voltage vector produced by the voltage vector control means is determined in response to the torque deviation or flux deviation.

Another object of the present invention is to provide an inverter control system comprising: means for calculating the primary flux vector from the primary voltage applied to the motor and primary current flowing through the motor; means for calculating an instantaneous torque value from the primary flux vector and primary current; means for calculating a primary flux deviation of the primary flux vector from the primary flux command value; means for calculating torque deviation of an instantaneous torque value from the torque command value; means for calculating a phase angle of the primary flux vector; means for generating a pulse signal which alternates cyclically at a time interval that depends on the primary flux deviation or torque deviation; means for producing in response to the pulse signal a first control flag as a command of increasing or decreasing the magnitude of primary flux vector based on the primary flux deviation and a second control flag as a command of increasing, decreasing or retaining the instantaneous torque value based on the torque deviation; and means for producing a voltage vector to be delivered to the inverter based on a phase angle and control flag.

The pulse generation means, preferably, includes means for generating a modulation wave which alternates cyclically at a prescribed amplitude, and means for rendering pulse width modulation to one of the torque deviation and the primary flux deviation. The control flag generation means may include compensation means which produces a compensation signal by rendering one of proportional amplification and proportional-integral amplification to one of the primary flux deviation and torque deviation. The control flag generation means may include limiter means which limits one of the primary flux deviation, torque deviation and compensation signal to a prescribed value. The control flag generation means, preferably, includes polarity manipulating means which manipulates a polarity of one of the deviations, the compensation signal and the modulation wave in accordance with one of the torque command value and the torque deviation. The inverter control system may further includes voltage modifying means for modifying the primary voltage in accordance with one of a duty ratio of the pulse or the time of alteration of a control flag to a different value.

A further object of the present invention is to provide an inverter control system comprising: means for calculating a primary flux vector from primary voltage applied to the motor and primary current flowing through the motor; means for calculating an instantaneous torque value from the primary flux vector and the primary current; means for calculating primary flux deviation of the primary flux vector from the primary flux command value; means for calculating torque deviation of the instantaneous torque value from the torque command value; means for calculating a phase angle of the primary flux vector; means for producing a first control flag as a command of increasing or decreasing the magnitude of primary flux vector based on the primary flux deviation and a second control flag as a command of increasing, decreasing or retaining the instantaneous torque value based on the torque deviation; means for producing a voltage vector to be delivered to the inverter based on a phase angle and control flag; and means for altering, on each expiration of a prescribed time length, the control flag by a time length shorter than the prescribed time length.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 10A and 10B are timing charts explaining the operation of the polarity manipulating unit of the fourth embodiment;

FIGS. 11A and 11B are timing charts explaining the operation of a variant arrangement of the polarity manipulating unit of the fourth embodiment;

FIG. 12 is a block diagram of the control flag altering unit based on a fifth embodiment of this invention;

FIGS. 13A, 13B and 13C are timing charts explaining the operation of the control flag altering unit of the fifth embodiment;

DESCRIPTION OF THE PREFERRED EMBODIMENTS

The embodiments of the present invention will be explained with reference to the drawings.

Figure 1:
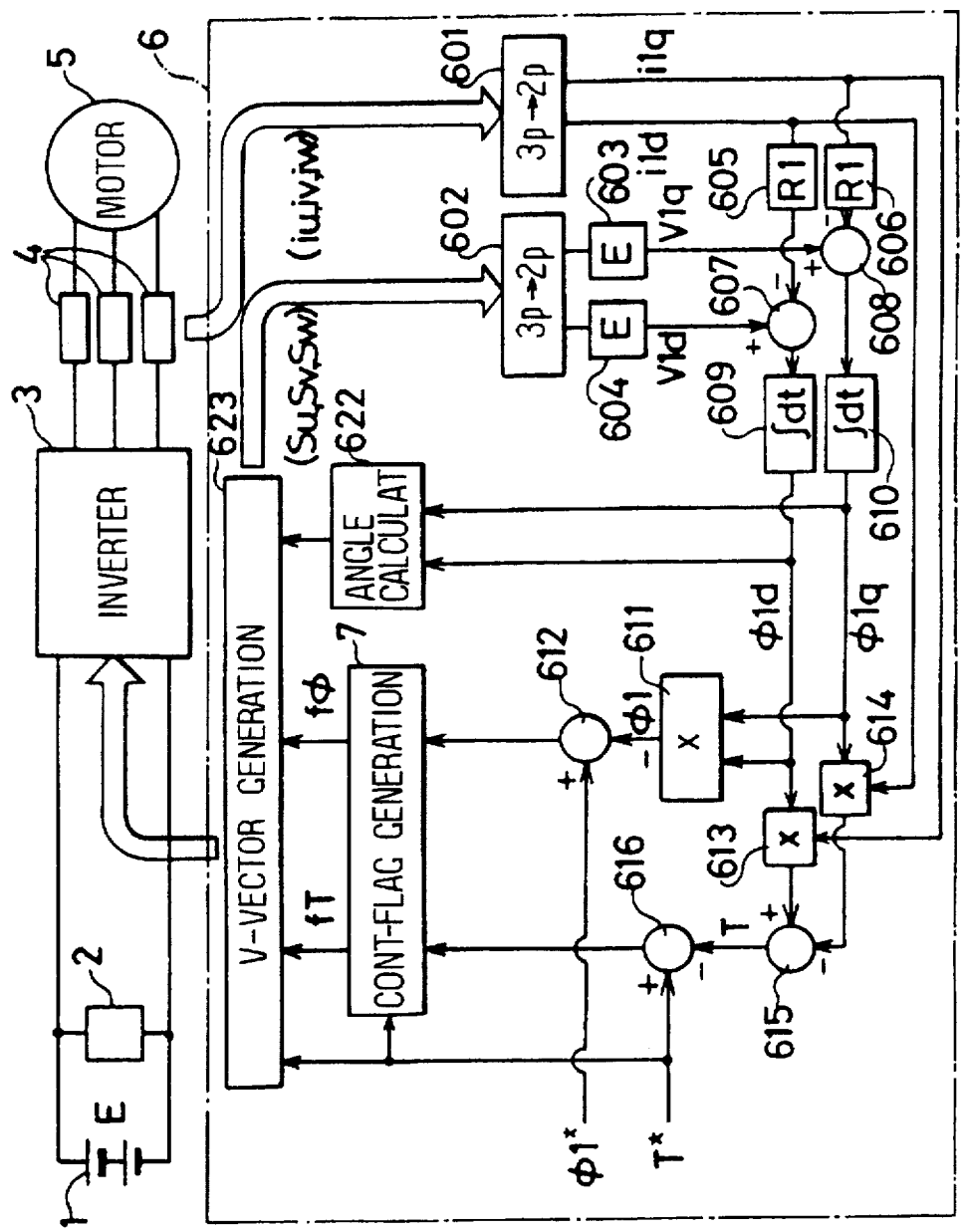
FIG. 1 is a block diagram of the inverter control system for operating an induction motor according to a first embodiment of this invention.

FIG. 1 shows the inverter control system based on the first embodiment of this invention. The system includes a battery 1, a battery voltage detector 2, a PWM inverter 3 which operates as three double-pole switches and is made up of switching elements, e.g., transistors, and diodes in antiparallel connection on six arms, current detectors 4, a 3-phase induction motor 5, and an inverter control circuit 6.

The inverter control circuit 6 includes a block 601 which converts the primary current vector of 3-phase currents iu, iv and iw detected by the current detectors 4 into axial components $i1d$ and $i1q$ of two axes d and q, a block 602 which calculates the unit vector of the primary terminal voltage based on the switching states (Su, Sv and Sw) in the inverter control circuit 3, and blocks 603 and 604 which calculate the axial components $V1d$ and $V1q$ of primary terminal voltage vector by multiplying the battery voltage detected by the voltage detector 2 to the unit vector.

Further included are blocks 605 and 606 which multiply the resistance value R1 of the primary winding of the induction motor 5 by the axial components $i1d$ and $i1q$ of the primary current vector of the 3-phase current thereby to evaluate the voltage value, blocks 607 and 608 which subtract the voltage value provided by the blocks 605 and 606 from the axial components $V1d$ and $V1q$ of the primary terminal voltage provided by the blocks 603 and 604, and blocks 609 and 610 which calculate the axial components $\phi1d$ and $\phi1q$ of the primary magnetic flux vector through the integral operation for the voltage value provided by the blocks 607 and 608.

Further included are a block 611 which calculates the length $\phi1$ of the primary flux vector from the axial components $\phi1d$ and $\phi1q$ of the primary flux vector, a block 612 which evaluates the primary flux deviation $\Delta\phi$ by subtracting the primary flux vector length $\phi1$ from the primary flux command value $\phi1^*$, blocks 613 and 614 which evaluate the axial components of instantaneous torque T through the multiplying operation between the axial components $i1d$ and $i1q$ of the primary current vector provided by the block 601 and the axial components $\phi1d$ and $\phi1q$ of the primary flux vector provided by the blocks 609 and 610, a block 615 which evaluates the instantaneous torque T from its axial components provided by the blocks 613 and 614, and a block 616 which evaluates the torque deviation $\Delta T$ by subtracting the instantaneous torque T from the torque command T*.

Moreover, the voltage vector generation unit 623 functions in the same manner as the switching table described before as a conventional system. The system of the present invention includes a voltage vector control unit 7 in place of the 3-value hysteresis comparator and 2-value hysteresis comparator of the conventional system.

The first embodiment of this invention provides a first torque flag fT1 indicative of the torque increase in the forward direction or reverse direction and a second torque flag fT2 indicative of the torque increase or torque retention.

The following Table 1 shows the correspondence between the torque flags fT1 and fT2 and the prior art torque flag fT.

TABLE 1

| fT1 | fT2 | fT |
|---|---|---|
| 1 | 0 | 0 |
| 1 | 1 | 1 |
| -1 | 0 | 0 |
| -1 | 1 | -1 |

Figure 2:
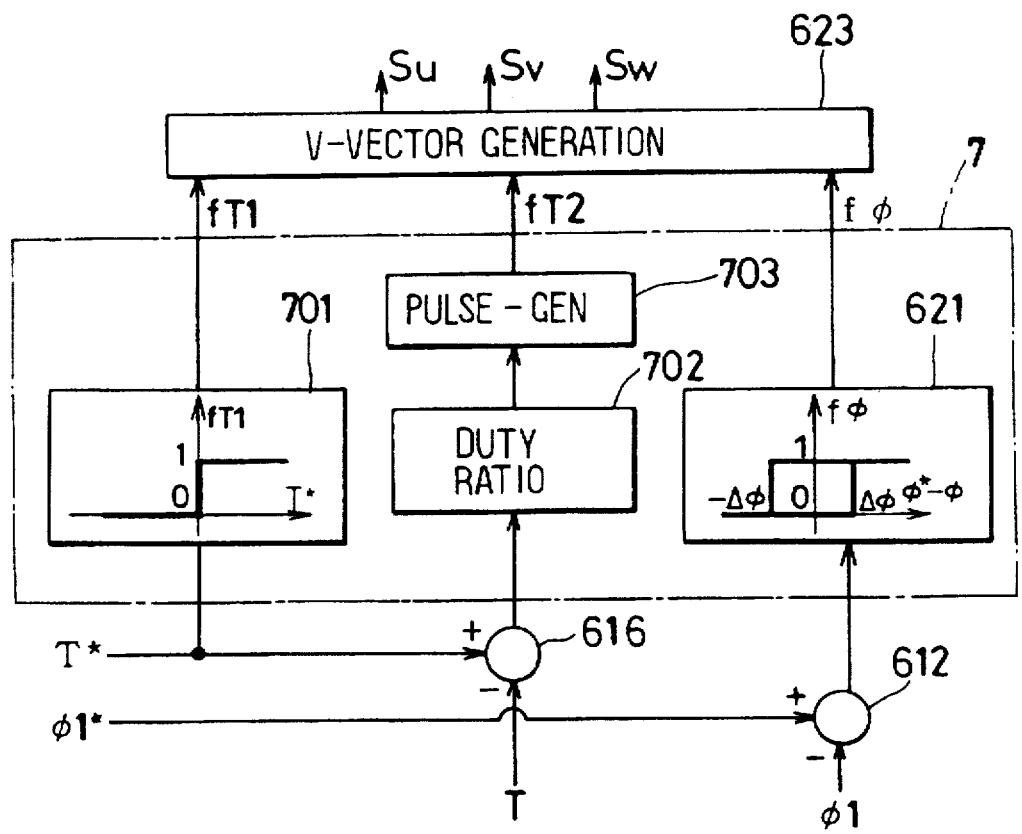
FIG. 2 is a block diagram of the control flag generation unit of the first embodiment.

In FIG. 2, the control flag generation unit (or voltage vector control unit) 7 of this embodiment includes a polarity detecting unit 701 which detects the polarity of the torque command value and delivers the resulting first torque flag fT1 to the voltage vector generation unit 623, a duty ratio calculation unit 702 which calculates the duty ratio from the torque deviation, a pulse generation unit 703 which produces a pulse train in accordance with the duty ratio and delivers the resulting second torque flag fT2 to the voltage vector generation unit 623, and a 2-value hysteresis comparator 621.

Figure 3:
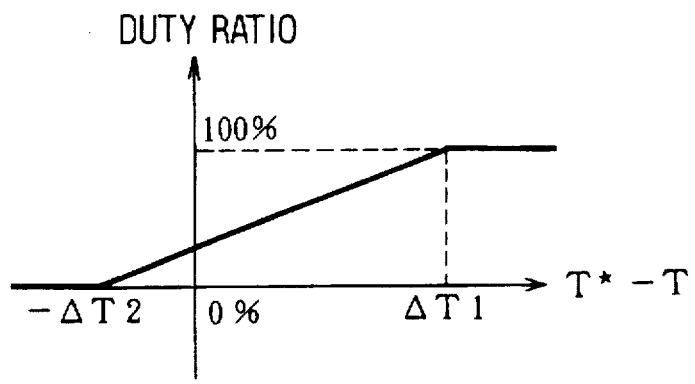
FIG. 3 is a graph explaining the operation of the duty ratio generation unit of the first embodiment.

FIG. 3 shows the operation of the duty ratio calculation unit 702.

The first torque flag fT1 which is produced by the polarity detecting unit 701 and delivered to the voltage vector generation unit 623 is set to be fT1=1 for increasing the output torque of the induction motor, which is operated in forward drive mode or reverse regeneration mode, in the forward direction, when the torque command is positive.

In FIG. 3, the second torque flag fT2 which is produced by the duty ratio calculation unit 702 and delivered to the pulse generation unit 703 is set to be 0% when the torque deviation is smaller than a threshold value $-\Delta T2$, set to be 100% when the torque deviation is greater than a threshold value $\Delta T1$, or it has a value between 0% and 100% for a torque deviation between these threshold values. Although the calculated duty ratio has a linear relation with the torque deviation in FIG. 3, they may have a nonlinear relation.

The pulse generation unit 703 produces in a period of t seconds a pulse train having an on-period of t (seconds)× duty ratio (%)/100 (%) and an off-period of t (seconds)× (100−duty ratio (%))/100 (%). The pulse train is delivered as the second torque flag fT2 to the voltage vector generation unit 623. The on-period and off-period are indicated by values "1" and "0", respectively, of the second torque flag fT2 in Table 2.

Based on this arrangement, the alternating second torque flag fT2 revises the voltage vector at least twice in a certain time length of t seconds unless the duty ratio is 0% or 100%, and it is possible to set an intended period for the switching of the voltage vector irrespective of the period of calculation of the primary flux vector and instantaneous torque. Consequently, it becomes possible to set the upper limit of the switching frequency of the PWM inverter 3 so as to suppress the heat generation so that the inverter suffices with a smaller cooling device. It becomes also possible to set the lower limit of the inverter switching frequency so that the magnetic noise and torque fluctuation of the induction motor 5 are alleviated.

Table 1 reveals that the voltage vector generation unit 623 selects the zero voltage vector that causes all line voltages of the induction motor 5 to be 0 volts when the second torque flag fT2 is "0". By altering control of the second torque flag fT2 in proportion to the torque deviation, the zero voltage vector is used frequently when the torque deviation is small, and the voltage vector for the torque increase is used frequently when the torque deviation is large. Consequently, in case a small torque command is given at starting or during the operation of the induction motor 5, the average voltage vector produced is smaller as compared with the prior art system, and the output shock of the induction motor 5 can be reduced. The use of the zero voltage vector suppresses abrupt change of the primary current so that the sharp torque variation of the induction motor 5 and the motor output shock can be reduced.

As a variant arrangement of the control flag generation unit (voltage vector control unit) 7 of the first embodiment in which the duty ratio calculation unit 702 and pulse generation unit 703 are placed at the output of the torque deviation calculation unit 616 and the 2-value hysteresis comparator 621 is placed at the output of the primary flux deviation calculation unit 612, it may be arranged to have the duty ratio calculation unit 702 and pulse generation unit 703 placed at the output of the primary flux deviation calculation unit 612 and the 3-value hysteresis comparator 620 placed at the output of the torque deviation calculation unit 616, in which case also the voltage vector is revised at least twice in a period of t seconds and it is possible to set an intended period of the switching of the voltage vector irrespective of the period of calculation of the primary flux vector and instantaneous torque. The polarity detecting unit 701 is unnecessary in the modified arrangement.

As another variant arrangement of the control flag generation unit 7 of the first embodiment, pairs of duty ratio calculation unit 702 and pulse generation unit 703 may be placed at the output of the torque deviation calculation unit 616 and at the output of the primary flux deviation calculation unit 612, and the same effectiveness as the foregoing embodiment is attained.

As still another variant arrangement of the control flag generation unit 7 of the first embodiment, the duty ratio calculation unit 702 may include a limiter unit for setting the upper limit and lower limit of the primary flux deviation or the torque deviation or the duty ratio so that the torque flag fT2 alternates in a certain period of t seconds, causing the voltage vector to be revised at least twice in the time length of t seconds irrespective of the value of the primary flux vector or instantaneous torque, and the magnetic noise and torque fluctuation of the induction motor 5 can further be reduced.

As still another variant arrangement of the control flag generation unit 7 of the first embodiment, the polarity detecting unit 701 may be placed at the output of the torque deviation calculation unit 616, and the same effectiveness as the foregoing embodiment is attained.

Figure 4:
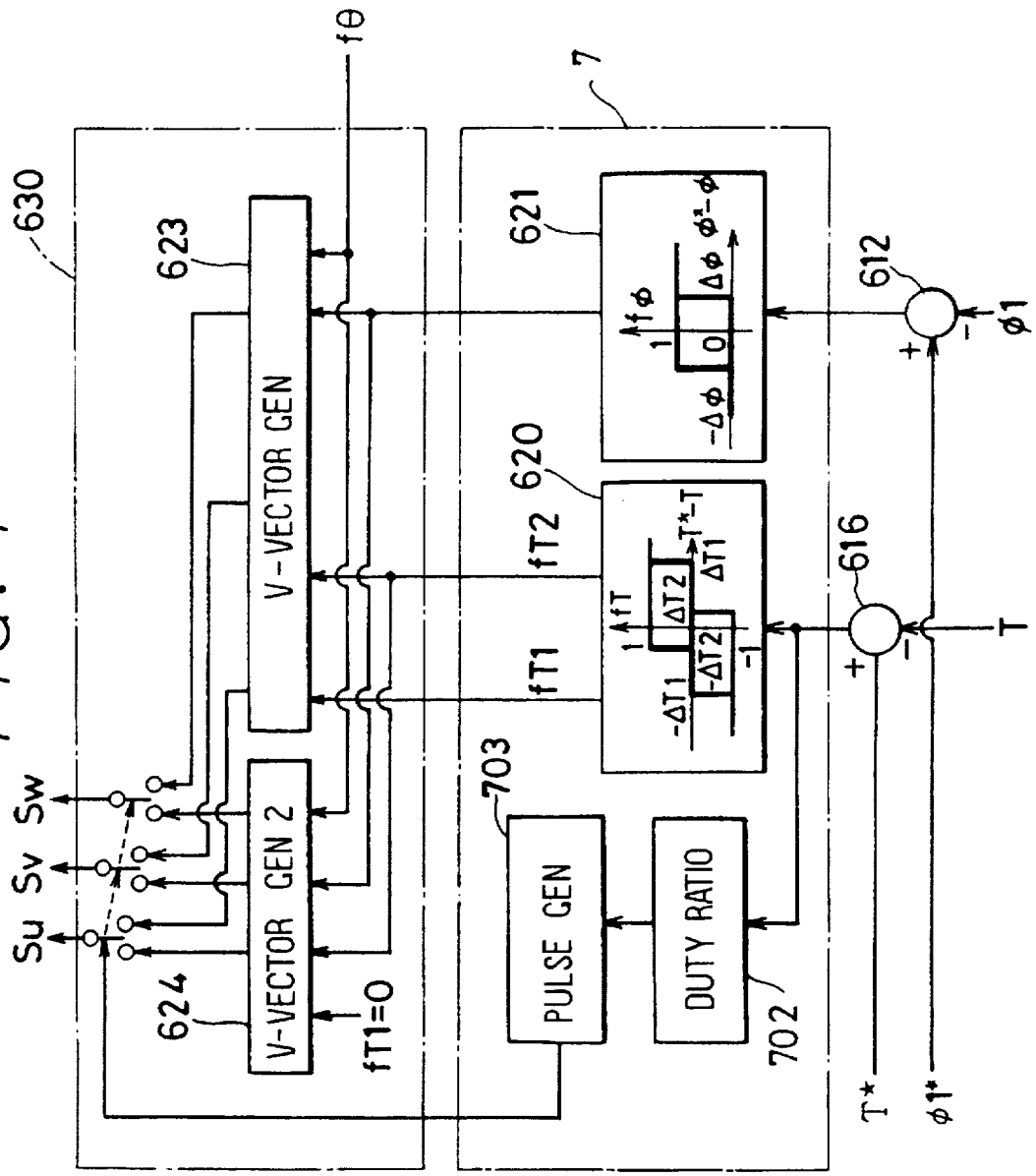
FIG. 4 is a block diagram of a variant arrangement of the control flag generation unit of the first embodiment.

As still another variant arrangement of the control flag generation unit 7 of the first embodiment, a plurality of voltage vector generation units (switching tables) 623 and 624 may be provided, with one set of voltage vectors being selected by the output pulse of the pulse generation unit 703 and delivered to the PWM inverter 3 as shown in FIG. 4, and the same effectiveness as the foregoing embodiment is attained.

The period t of duty ratio of the second torque flag fT2 may be set arbitrarily.

Figure 5:
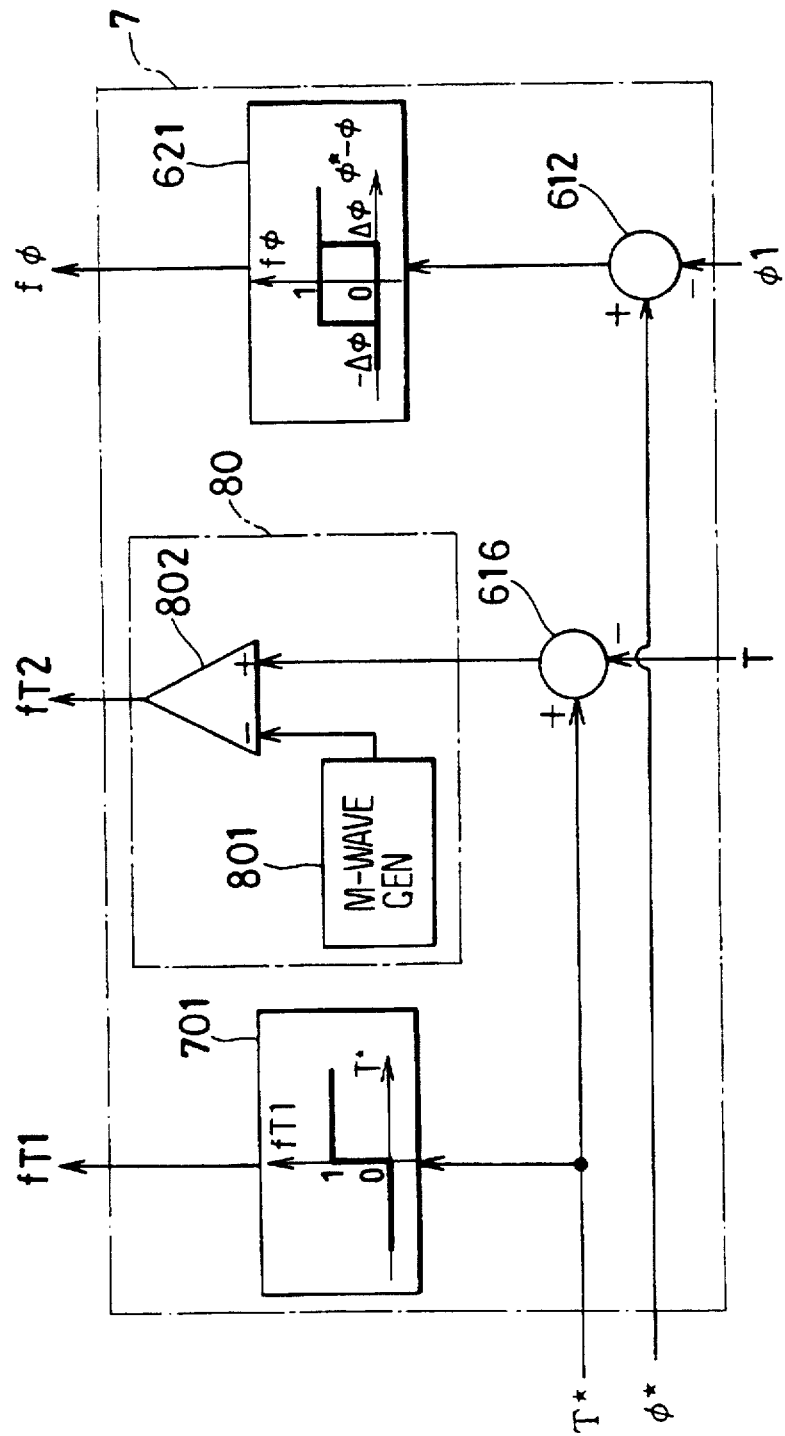
FIG. 5 is a block diagram of the pulse width modulation unit based on a second embodiment of this invention.

FIG. 5 shows the second embodiment of this invention. The control flag generation unit 7 of this embodiment includes a pulse width modulation unit 80 which modulates the second torque flag fT2 to pulsate in a duty ratio responsive to the torque deviation in place of the duty ratio calculation unit 702 and pulse generation unit 703 shown in FIG. 2. The pulse width modulation unit 80 consists of a modulation wave generation unit 801 and a comparator unit 802 which compares the modulation wave produced by the modulation wave generation unit 801 with the torque deviation, and delivers a resulting 2-level signal.

Figure 6:
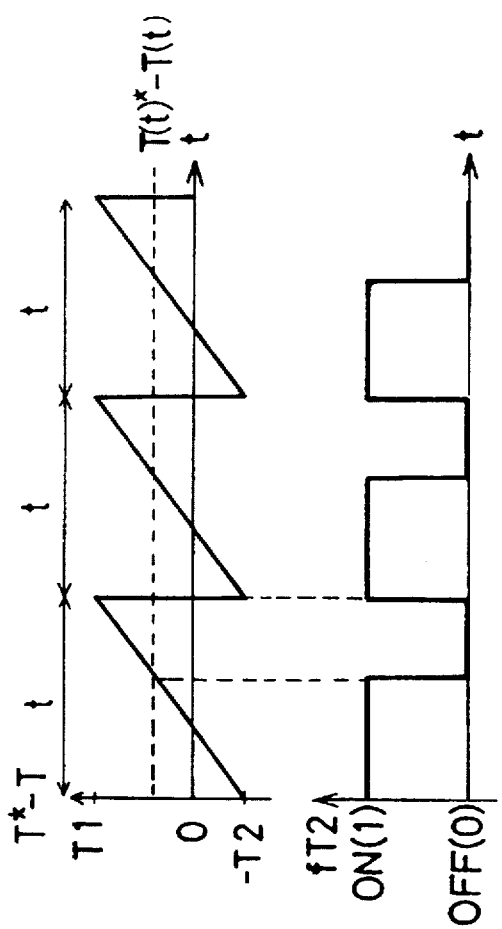
FIGS. 6A and 6B are timing charts explaining the operation of the pulse width modulation unit of the second embodiment.

FIGS. 6A and 6B show the operation of the control flag generation unit 7 of this embodiment. The modulation wave generation unit 801 generates a triangular wave having a prescribed period t, an upper peak level of $\Delta T$ and a lower peak level of $-\Delta T2$ as shown in FIG. 6A. The comparator unit 802 produces an output of fT2="1" (on) if the magnitude of modulation wave is greater than the torque deviation, or produces an output of fT2="0" (off) if the magnitude of modulation wave is smaller than the torque deviation as shown in FIG. 6B. The output of the comparator unit 802 has the same period t as the modulation wave. The resulting pulsating second torque flag fT2 is delivered to the voltage vector generation unit 623.

This embodiment attains the same effectiveness as the first embodiment. Specifically, it enables the inverter to have a smaller cooling device, prevents the magnetic noise and torque fluctuation of the induction motor 5, and alleviates the motor output shock at starting and during the operation.

As a variant design of the second embodiment, the modulation wave generation unit 801 may generate a triangular wave having a period t that is variable.

As a variant arrangement of the control flag generation unit 7 of the second embodiment in which the pulse width modulation unit 80 is placed at the output of the torque deviation calculation unit 616 and the 2-value hysteresis comparator 621 is placed at the output of the primary flux deviation calculation unit 612, it may be arranged to have the pulse width modulation unit 80 placed at the output of the primary flux deviation calculation unit 612 and the 3-value hysteresis comparator of the prior art system mentioned before placed at the output of the torque deviation calculation unit 616, and the same effectiveness as the foregoing embodiment is attained.

As still another variant arrangement of the control flag generation unit 7 of the second embodiment, the pulse width modulation unit 80 may be placed individually at the output of the torque deviation calculation unit 616 and at the output of the primary flux deviation calculation unit 612, and the same effectiveness as the foregoing embodiment is attained.

Figure 7:
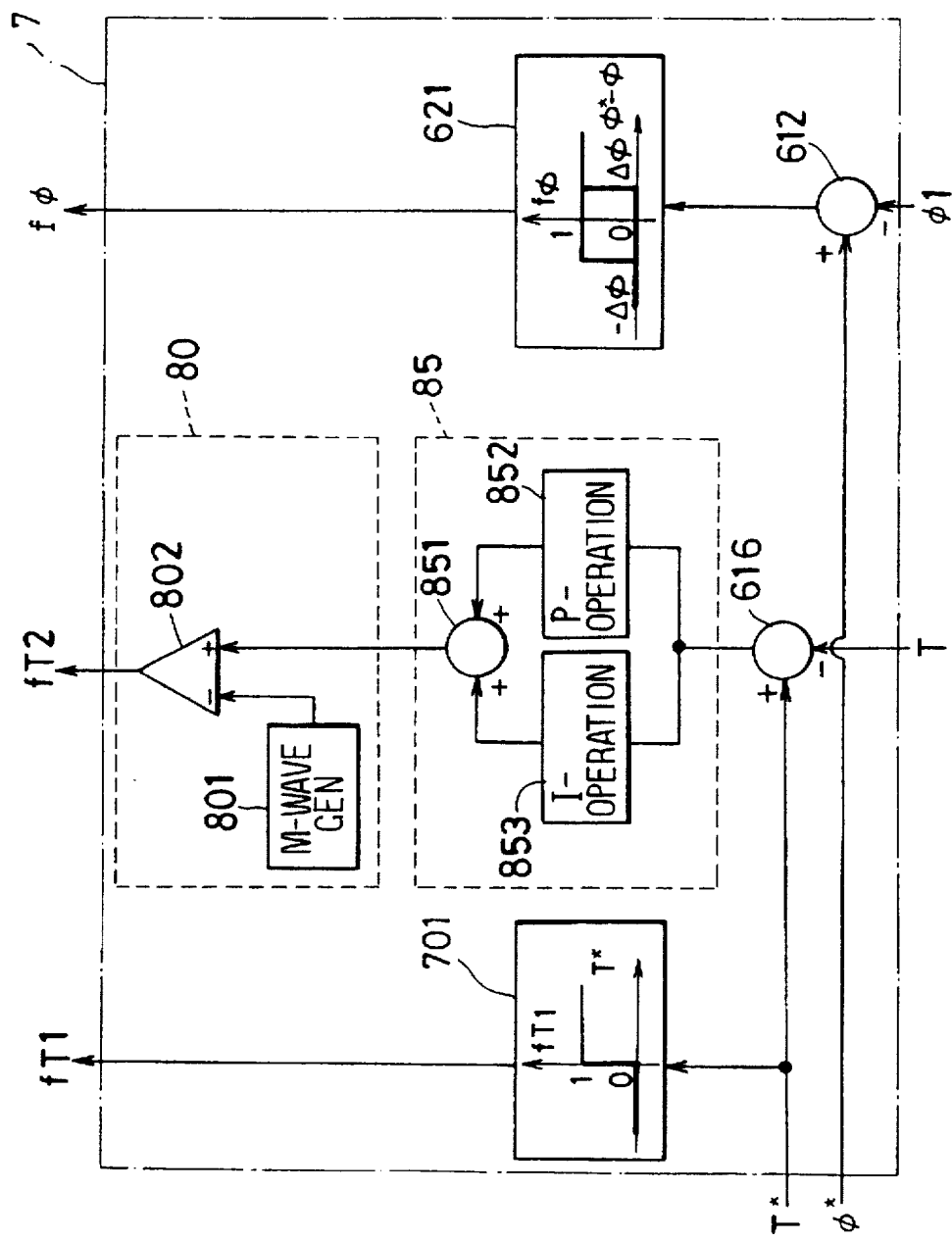
FIG. 7 is a block diagram of the proportional-integral operation unit based on a third embodiment of this invention.

FIG. 7 shows the third embodiment of this invention. The control flag generation unit 7 of this embodiment is derived from the second embodiment shown in FIG. 5, with a proportional-integral operation unit 85 which renders the proportional-integral operation to the torque deviation thereby to produce a compensation signal being added between the output of the torque deviation calculation unit 616 and the input of the pulse width modulation unit 80. The proportional-integral operation unit 85 consists of a proportional operation unit 852 which amplifies the torque deviation, an integral operation unit 853 which integrates the torque deviation, and a summing unit 851 which sums the outputs of the operation unit 852 and 853 to produce the compensation signal.

The compensation signal produced by the proportional-integral operation unit 85 determines the duty ratio of the second torque flag fT2. Specifically, a larger compensation signal increases the on-period of the second torque flag fT2, causing the motor output torque to rise, while a smaller compensation signal decreases the on-period of fT2, causing the motor output torque to fall.

Figures 8A, 8B:
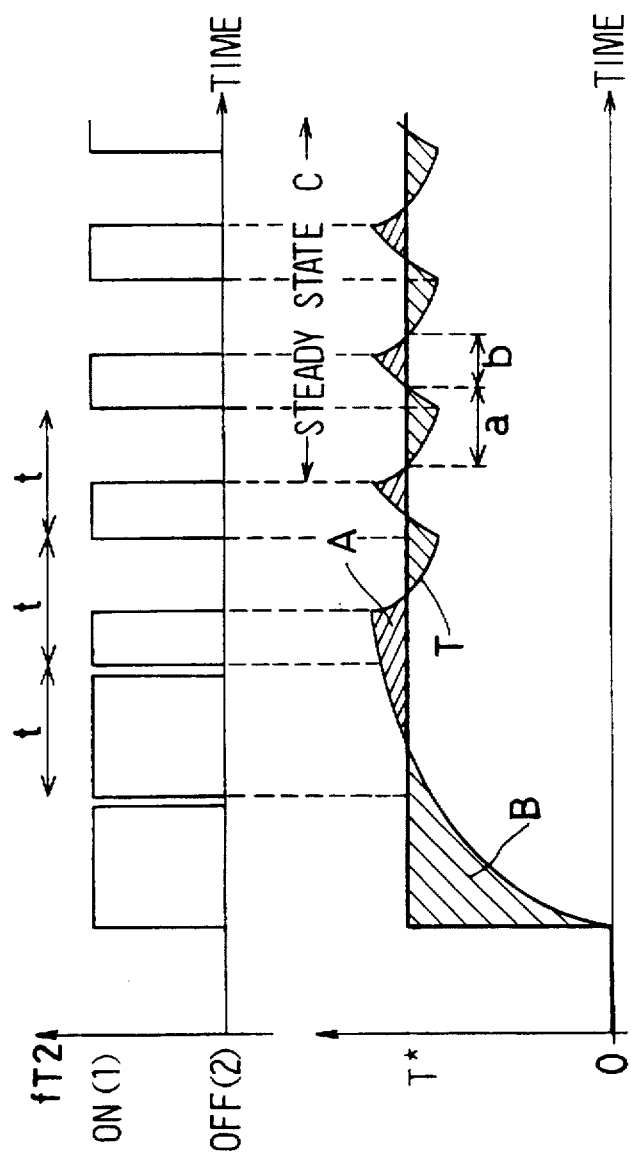
FIGS. 8A and 8B are timing charts explaining the operation of the proportional-integral operation unit of the third embodiment.

FIGS. 8A and 8B explain the operation of the control flag generation unit 7 of this embodiment. Shown in FIG. 8A is the second torque flag fT2 which alternates in a prescribed period t, and shown in FIG. 8B is the instantaneous output torque resulting from the second torque flag fT2.

The integral operation unit 853 holds and releases the total deviation of the instantaneous torque from the torque command value, thereby manipulating the duty ratio of the second torque flag fT2 so that the torque command value and instantaneous torque have an equal mean value. On the waveforms of FIG. 8A, the integral operation continues until the total of hatched areas A and the total of the hatched areas B are equal, at which point of the entry to a steady state c where the torque command value T* and instantaneous torque T are equal in their mean values, the integral operation unit 853 delivers the integration result as the compensation signal.

The proportional operation unit 852 manipulates the duty ratio of the second torque flag fT2 so that the instantaneous torque T reaches the torque command value T* quickly. For example, during the period "a" of FIG. 8A when the instantaneous torque T is smaller than the torque command value T*, the proportional operation unit 852 increases the output so as to designate frequently a voltage vector that increases the output torque, and during the period "b" when the instantaneous torque T is greater than the torque command value T*, the proportional operation unit 852 decreases the output so as to designate frequently a voltage vector that decreases the output torque.

Consequently, the instantaneous torque approaches the torque command value, and the deviation of the instantaneous torque from the torque command value decreases. The on-period and off-period of the second torque flag fT2 correspond to "1" and "0", respectively, of Table 1.

According to the foregoing arrangement of the third embodiment which is based on the provision for the control flag generation unit 7 of the second embodiment of the proportional-integral operation unit 85 that implements the proportional-integral operation for the torque deviation to produce the compensation signal, the mean value of the instantaneous torque coincides with the torque command value without being affected by the rotation of the induction motor 5 and the high-accuracy high-response torque control can be accomplished.

As a variant arrangement of the third embodiment, the proportional-integral operation unit 85 may be replaced with the sole proportional operation unit 852 which amplifies the torque deviation.

As another variant arrangement of the control flag generation unit 7 of the third embodiment, in which the proportional-integral operation unit 85 is placed at the output of the torque deviation calculation unit 616 and the 2-value hysteresis comparator 621 is placed at the output of the primary flux deviation calculation unit 612, it may be arranged to have the proportional-integral operation unit 85 placed at the output of the primary flux deviation calculation unit 612 and the 3-value hysteresis comparator of the afore-mentioned prior art system placed at the output of the torque deviation calculation unit 616.

As still another variant arrangement of the control flag generation unit 7 of the third embodiment, the proportional-integral operation unit 85 may be placed individually at the output of the torque deviation calculation unit 616 and at the output of the primary flux deviation calculation unit 612, and the same effectiveness as the foregoing embodiment is attained.

Figure 9:
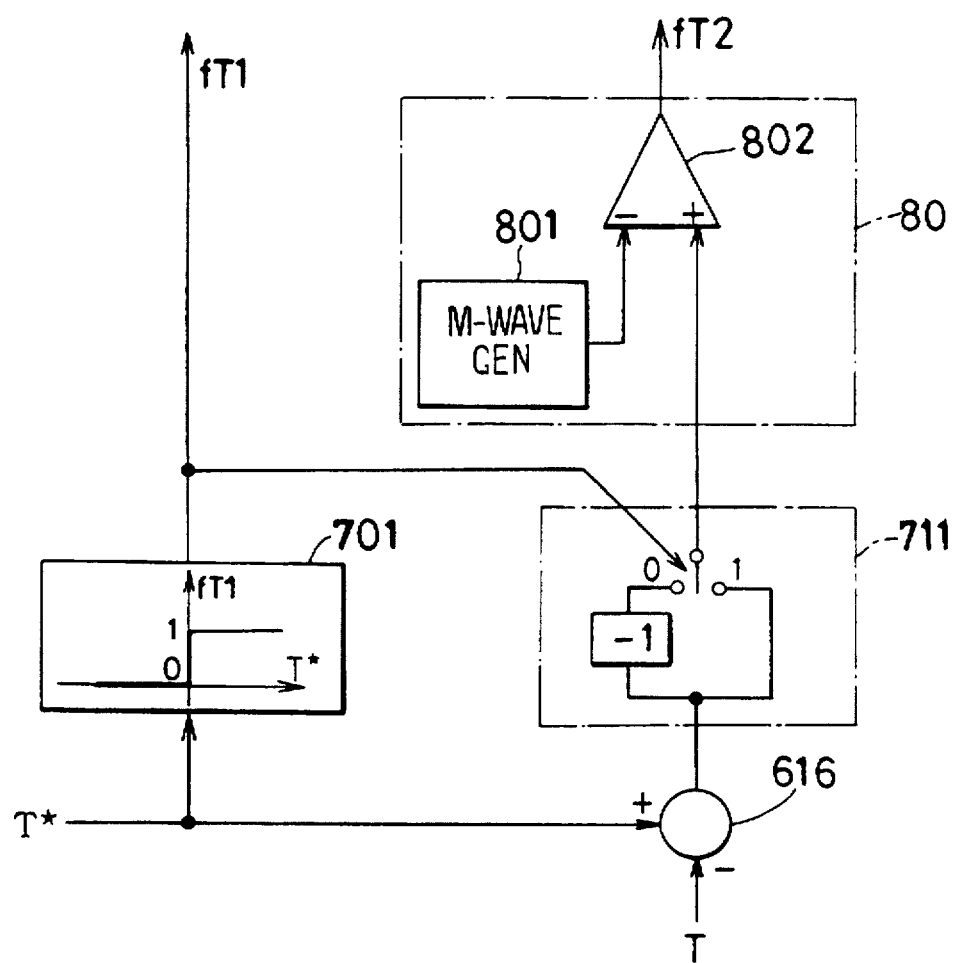
FIG. 9 is a block diagram of the polarity manipulating unit based on a fourth embodiment of this invention.

FIG. 9 shows the fourth embodiment of this invention. The control flag generation unit 7 of this embodiment is derived from the second embodiment shown in FIG. 5, with a polarity manipulating unit 711 which manipulates the polarity of the torque deviation in response to the first torque flag fT1 produced by the polarity detecting unit 701 being added.

In the case of a positive torque command value T* (forward drive mode or reverse regeneration mode of the induction motor), the polarity manipulating unit 711 passes the torque deviation intact and the operation of the control flag generation unit 7 is the same as the first embodiment.

FIGS. 10A and 10B show the operation of the pulse width modulation unit 80 of the case of a negative torque command value T* (forward regeneration mode or reverse drive mode of the induction motor). The polarity manipulating unit 711 reverses the polarity of torque deviation appropriately to produce an improved torque deviation T-T*.

The first torque flag fT1 produced by the polarity detecting unit 701 is delivered to the voltage vector generation unit 623 as a command fT1=0 for increasing the torque in the reverse direction.

The second torque flag fT2 produced by the pulse width modulation unit 80 is "on" if the magnitude of modulation wave is greater than the torque deviation, or it is "off" if the magnitude of modulation wave is smaller than the torque deviation. The second torque flag fT2 which alternates to have the modulation wave period t is delivered to the voltage vector generation unit 623. The on-period and off-period of the second torque flag fT2 correspond to "1" and "0", respectively, of Table 1.

With the ability of operation for a negative torque command value T*, the inverter control system based on the fourth embodiment is operative in all modes (drive and regeneration in forward and reverse directions) of the induction motor 5, and it attains in all operation modes the same effectiveness as the second embodiment. This 4-quadrant operation, which is entirely based on the same duty ratio control as the positive torque command operation, is made possible by the reversing of the polarity of torque deviation by the polarity manipulating unit 711 in correspondence to the polarities of torque command value T* and instantaneous torque T that are opposite to the case of a positive torque command value T*.

As a variant design of the fourth embodiment, the polarity of modulation wave of the pulse width modulation unit may be manipulated depending on the polarity of the torque command value T*, and the same effectiveness as the foregoing embodiment is attained.

As another variant design of the fourth embodiment, the torque deviation may be rendered using pulse width modulation based on two modulation waves having opposite polarities in producing the torque flag fT as shown in FIGS. 11A and 11B, and the same effectiveness as the foregoing embodiment is attained.

The arrangements of the third embodiment and fourth embodiment may be combined thereby to attain their individual effectiveness at the same time.

As still another variant arrangement of the fourth embodiment, the proportional-integral operation unit 85 may be placed between the output of the polarity manipulating unit 711 and the input of the pulse width modulation unit 80 so as to manipulate the polarity of the compensation signal produced by the proportional-integral operation unit 85 in response to the polarity of the torque command value T*, and the same effectiveness as the foregoing embodiment is attained.

As variant arrangements of the first and third embodiments, their duty ratio calculation unit 702 and proportional-integral operation unit 85, which function identically, may be replaced with each other.

FIG. 12 shows the fifth embodiment of this invention. The control flag generation unit 7 of this embodiment includes a 2-value hysteresis comparator 621 which produces from the primary flux deviation the primary flux flag fφ as a command for increasing or decreasing the magnitude of primary flux vector, a 3-value hysteresis comparator 620 which produces from the torque deviation the torque flag fT as a command for increasing, decreasing or retaining the instantaneous torque value, and a torque flag altering unit 75 which adds pulses having a prescribed period T (e.g., 100 μs) and a short pulse width Δt to the torque flag fT thereby to produce an improved torque flag fT' based on criteria (e.g., indicating the retention of torque) different from those of the torque flag fT. The torque flag altering unit 75 consists of a timer unit 751 which measures the time interval T and a saw-wave adding unit 752 which produces the pulses of the short pulse width Δt.

FIGS. 13A, 13B and 13C show the operation of the control flag generation unit 7 of this embodiment. Since the torque flag fT produced by the 3-value hysteresis comparator 620 is a control flag indicative of torque-increase, torque-decrease or torque-retention depending on the torque deviation, intact delivery of the torque flag fT to the switching table (voltage vector generation unit) 623 will probably result in a switching frequency of PWM inverter 3 lower than the intended frequency. On this account, the saw-wave adding unit 752 operates to add pulses having a prescribed period T (e.g., 100 μs) and a short pulse width Δt to the torque flag fT thereby to produce an improved torque flag fT' having a prescribed increased frequency based on the criteria (e.g., indicating the retention of torque) different from those of the torque flag fT.

Based on the provision of the torque flag altering unit 75 for the control flag generation unit 7, the lower limit of the switching frequency of the PWM inverter 3 is set in terms of the prescribed time interval, and the switching frequency is prevented from falling too low.

As a variant arrangement of the torque flag altering unit 75 of the fifth embodiment, the manipulated period t of the improved torque flag fT' may be set arbitrarily by varying the time width measured by the timer 751.

As a variant arrangement of the control flag generation unit 7 of the fifth embodiment in which the timer 751 and saw-wave adding unit 752 are placed at the output of the 3-value hysteresis comparator 620 which produces the torque flag fT, the torque flag altering unit 75 may be provided at the output of the 2-value hysteresis comparator 621 so as to manipulate the primary flux flag fφ.

Figure 14:
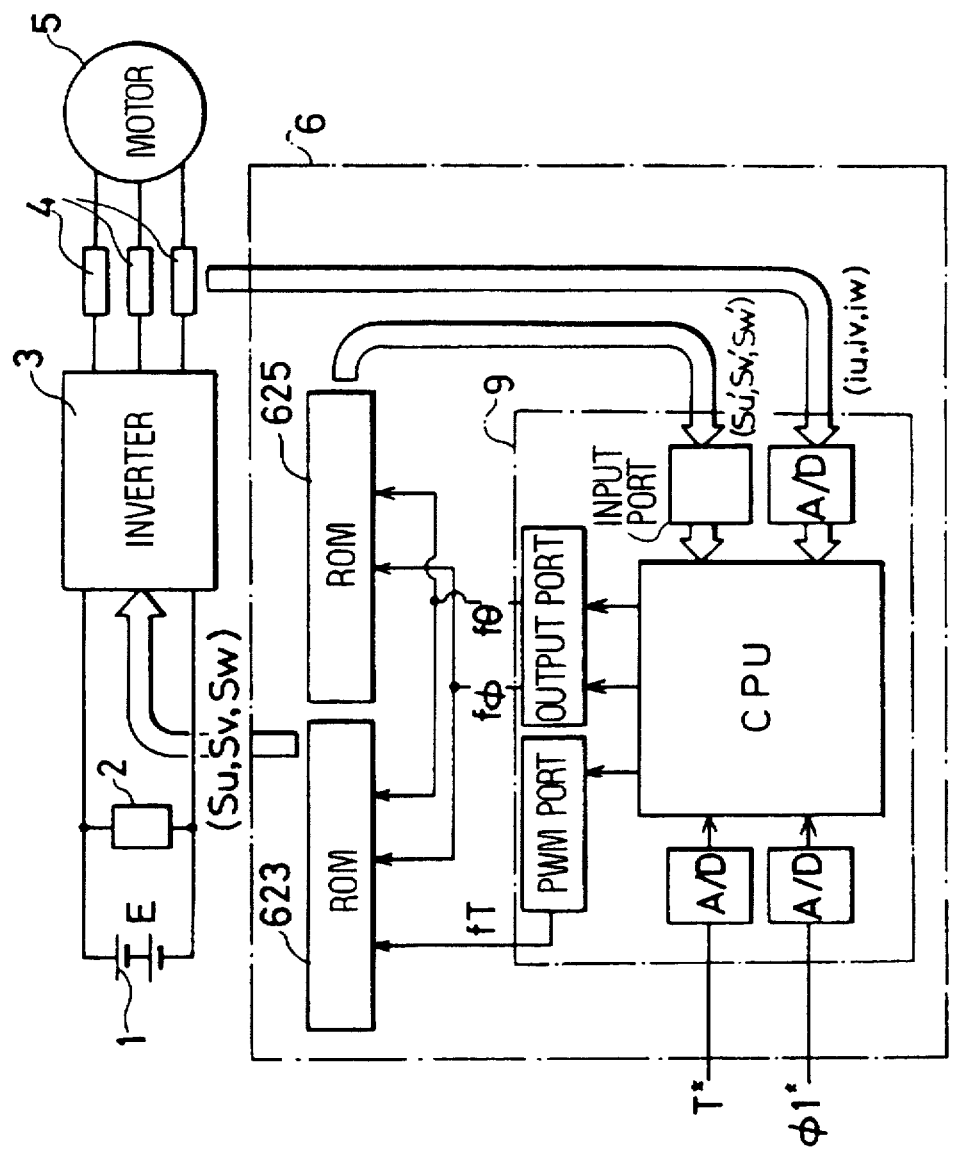
FIG. 14 is a block diagram of the inverter control system for an induction motor based on a sixth embodiment of this invention.

FIG. 14 shows the sixth embodiment of this invention. This embodiment is designed to accomplish an inverter control system having all functions of the preceding second through fifth embodiments by use of a microprocessor. The microprocessor 9 receives a torque command value T*, a primary flux command value fφ*, a battery voltage E, motor currents Iu, Iv and Iw, and voltage vectors Su, Sv and Sw, and produces a torque flag fT as a command for increasing, decreasing or retaining the torque, a primary flux flag fφ as a command for increasing or decreasing the primary flux, and a phase flag fθ indicative of the phase angle of the primary flux.

A switching table 623 stores a record of voltage vectors Su, Sv and Sw to be delivered to the PWM inverter 3 as in the preceding embodiments. Another switching table 625 stores a record of voltage vectors Su, Sv and Sw to be delivered to the microprocessor 9, and its contents is the same as the switching table 623 except that the zero voltage vectors (0 and 7) are removed as shown in Table 2.

TABLE 2

| fφ | fT | \multicolumn{6}{c}{fθ} | | | | | |
|----|----|-----|-----|-----|-----|-----|-----|
|    |    | (1) | (2) | (3) | (4) | (5) | (6) |
| 1  | 1  | 2   | 3   | 4   | 5   | 6   | 1   |
|    | -1 | 6   | 1   | 2   | 3   | 4   | 5   |
| -1 | 1  | 3   | 4   | 5   | 6   | 1   | 2   |
|    | -1 | 5   | 6   | 1   | 2   | 3   | 4   |

The microprocessor 9 is composed of a CPU which operates sequentially in accordance with a program, A/D converters which convert the analog signals into digital data, an input port which supplies digital data to the CPU, an output port which fetches digital data out of the CPU, and a PWM port which compares the calculated value from the CPU with the level of a triangular wave and produces a resulting pulse signal.

Figure 15:
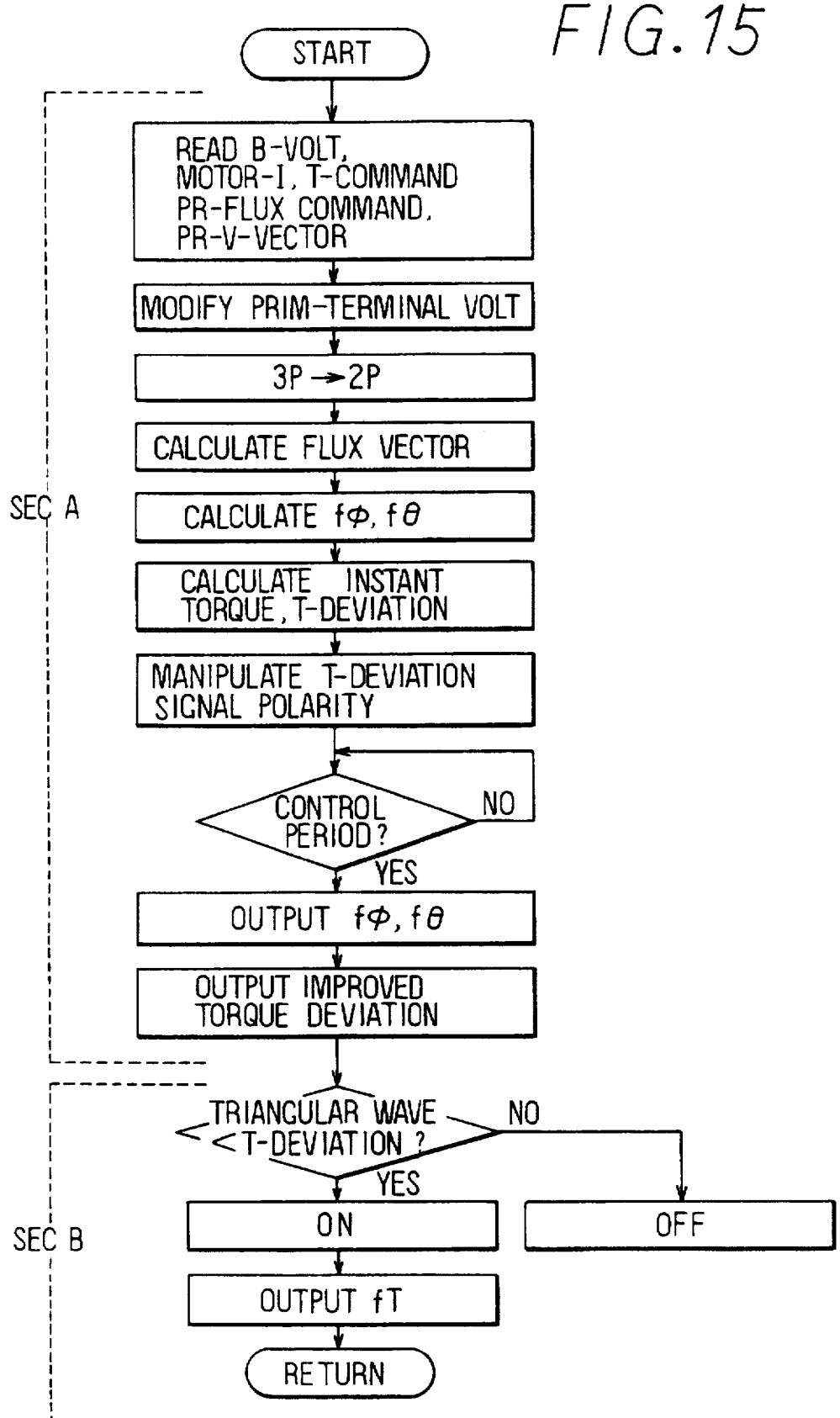
FIG. 15 is a flowchart explaining the operation of the microprocessor of the sixth embodiment.

FIG. 15 shows the operation of the microprocessor 9 used in the inverter control system of this embodiment. The operation consists of a routine of section A which is run cyclically by the CPU, and a routine of section B which is run concurrently and cyclically by the PWM port. In the flowchart, blocks corresponding to the functional blocks is well known, and the explanation thereof is omitted. The following explains the primary terminal voltage modification.

The inverter control system of this embodiment based on the microprocessor 9 manipulates the voltage vector through the PWM port. Therefore, the voltage vector shifts to the zero vector during the period after the CPU 9 has received the states of induction motor 5 such as the primary current and voltage vector until it produces the flags by expending a calculation time T0, and there arise deviations of the calculated torque from the actual torque value and the calculated primary flux vector from the actual vector value due to the inclusion of the zero vector.

Figure 16A:
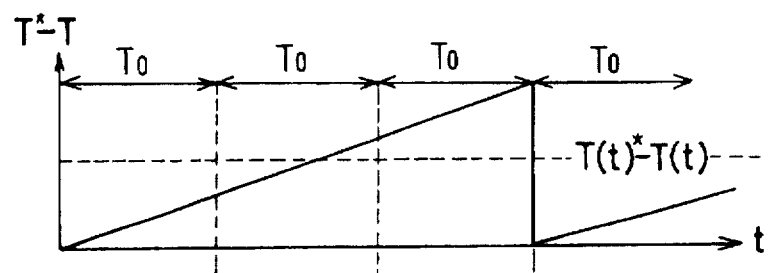
FIGS. 16A, 16B and 16C are timing charts showing the primary terminal voltage modification based on the sixth embodiment.
Figure 16B:
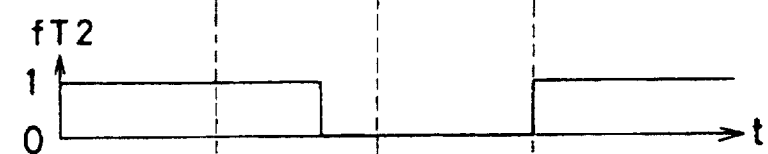
Figure 16C:
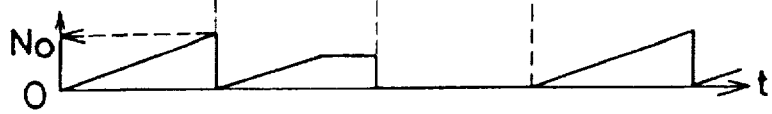
Figure 17:
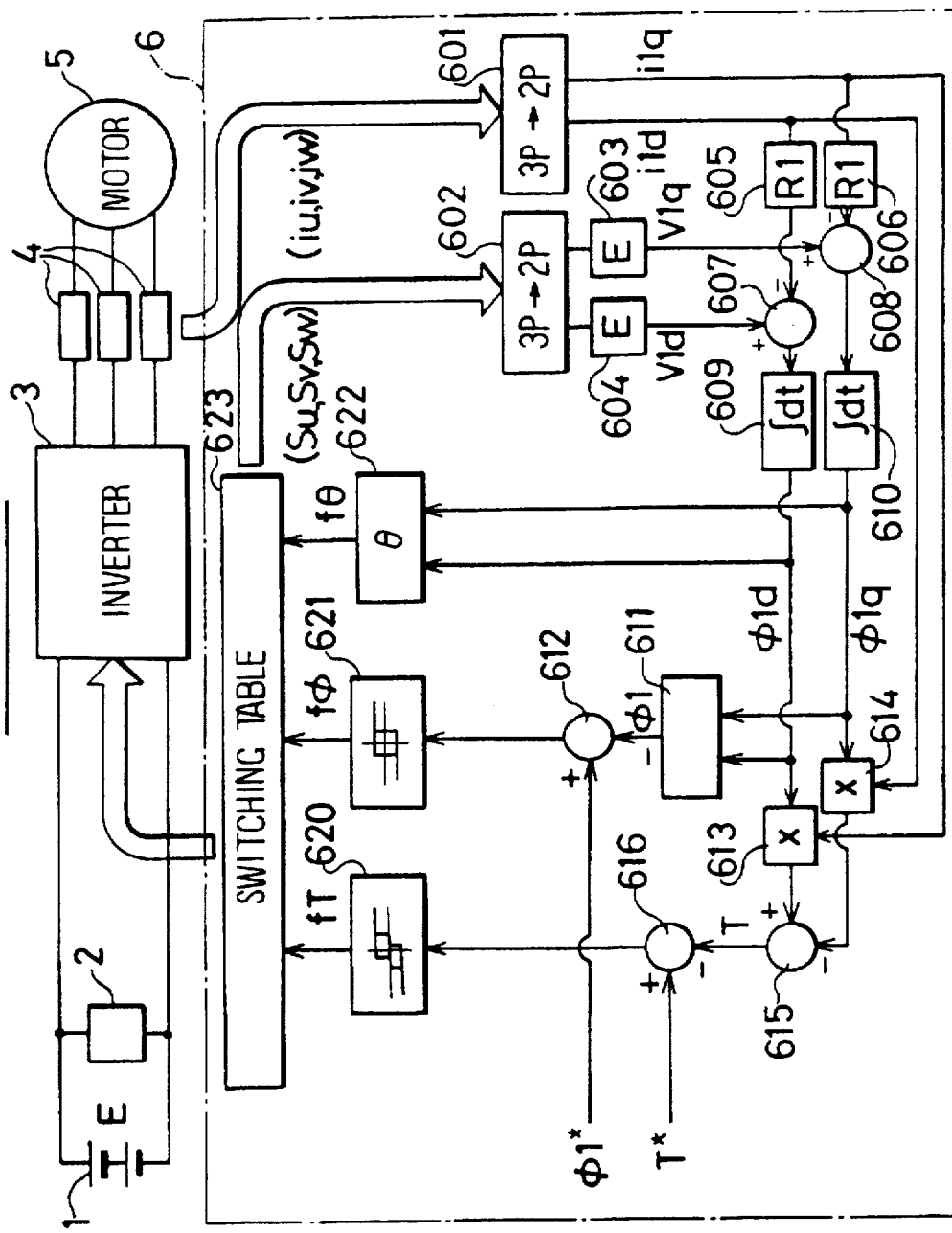
FIG. 17 is a block diagram of the prior art inverter control system for operating an induction motor.
Figure 18:
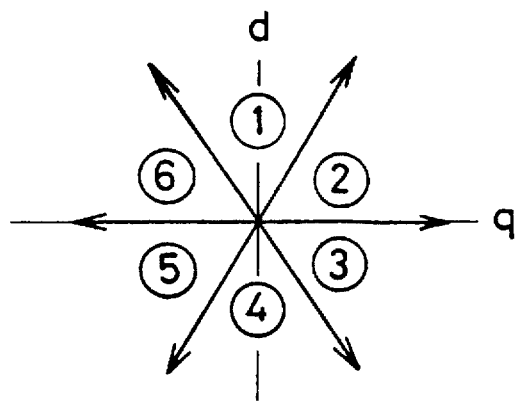
FIG. 18 is a diagram showing the phase angle sections of the primary flux vector of an induction motor.
Figure 19:
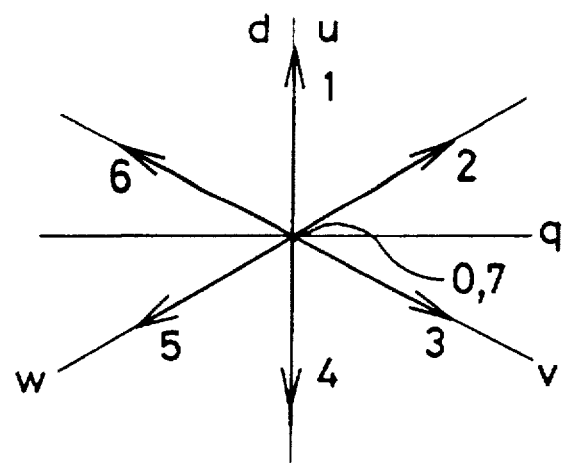
FIG. 19 is a diagram showing the correspondence between the voltage vectors of induction motor and the numeric values recorded in the switching table.

In order to correct these deviations, the system includes the primary terminal voltage modifying process, as will be explained with reference to FIGS. 16A, 16B and 16C. FIG. 16A shows the comparison by the PWM port of the magnitude of improved torque deviation (dashed line) with the triangular wave. FIG. 16B shows the second torque flag fT2 to be delivered to the switching table 623 resulting from the comparison operation, and FIG. 16C shows the count value of a counter which measures the on-period (command to increase the torque) of the second torque flag fT2.

The CPU calculates the duty ratio of the on-period of second torque flag fT2 to the CPU calculation time T0 by utilizing the fact that the switching table 623 always selects the zero vector when the second torque flag fT2 is "off". The primary terminal voltage is modified based on this duty ratio and the voltage vectors Su', Sv' and Sw' read out of the switching table 625 as follows.

U-phase terminal voltage=$E \times Su' \times$duty ratio

V-phase terminal voltage=$E \times Sv' \times$duty ratio

W-phase terminal voltage=$E \times Sw' \times$duty ratio

As a variant arrangement of the sixth embodiment in which the torque flag fT is manipulated based on the pulse width modulation of the torque deviation by the PWM port, the varying primary flux may be rendered the pulse width modulation with the PWM port thereby to manipulate the primary flux flag fφ.

The sixth embodiment is also applicable to the arrangement of the fifth embodiment using the torque flag altering unit.

According to the inventive inverter control system for operating an induction motor, as described above for its specific embodiments, it becomes possible by the addition of a simple device to make the inverter switching frequency constant which has been difficult for the prior art high-response torque control system, and consequently the magnetic noise and torque fluctuation of the induction motor can be reduced and the capacity of the inverter cooling device can be reduced.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An inverter control system for operating a multi-phase induction motor by controlling primary magnetic flux generated on a stator of said motor and output torque of said motor in accordance with a primary flux command value and a torque command value, respectively, said system comprising:

flux vector calculation means for calculating a primary flux vector from primary voltage applied to said motor and primary current flowing through said motor;

torque calculation means for calculating an instantaneous torque value from said primary flux vector and said primary current;

primary flux deviation calculation means for calculating a primary flux deviation of said primary flux vector from said primary flux command value;

torque deviation calculation means for calculating a torque deviation of said instantaneous torque value from said torque command value;

phase angle calculation means for calculating a phase angle of said primary flux vector;

pulse generation means for generating a pulse signal which alternates cyclically at a time interval that depends on said primary flux deviation or torque deviation;

control flag generation means for producing in response to said pulse signal a first control flag as a command of increasing or decreasing magnitude of said primary flux vector based on said primary flux deviation and a second control flag as a command of increasing, decreasing or retaining said instantaneous torque value based on said torque deviation; and voltage vector generation means for producing a voltage vector to be delivered to said inverter based on said phase angle and said control flag.

2. An inverter control system according to claim 1, wherein said pulse generation means includes means for generating a modulation wave which alternates cyclically at a prescribed amplitude, and means for rendering pulse width modulation to one of said torque deviation and said primary flux deviation.

3. An inverter control system according to claim 1, wherein said control flag generation means includes polarity manipulating means for manipulating a polarity of said deviations in accordance with one of said torque command value and said torque deviation.

4. An inverter control system according to claim 1 further including control means for restricting switching of a voltage vector by said voltage vector control means during a prescribed period.

5. An inverter control system according to claim 2, wherein said control flag generation means includes compensation means for producing a compensation signal by rendering one of proportional amplification and proportional-integral amplification to one of said primary flux deviation and torque deviation.

6. An inverter control system according to claim 5, wherein said control flag generation means includes limiter means for limiting one of said primary flux deviation and torque deviation signal to a prescribed value.

7. An inverter control system according to claim 6, wherein said control flag generation means includes polarity manipulating means for manipulating a polarity of said deviations in accordance with one of said torque command value and said torque deviation.

8. An inverter control system according to claim 7 further including voltage modifying means for modifying said primary voltage in accordance with one of a duty ratio of said pulse or said time of alteration of a control flag to a different value.

9. An inverter control system for operating a multi-phase induction motor by controlling primary magnetic flux generated on a stator of said motor and output torque of said motor in accordance with a primary flux command value and a torque command value, respectively, said system comprising:

flux vector calculation means for calculating a primary flux vector from primary voltage applied to said motor and primary current flowing through said motor;

torque calculation means for calculating an instantaneous torque value from said primary flux vector and said primary current;

primary flux deviation calculation means for calculating primary flux deviation of said primary flux vector from said primary flux command value;

torque deviation calculation means for calculating torque deviation of said instantaneous torque value from said torque command value;

phase angle calculation means for calculating a phase angle of said primary flux vector;

control flag generation means for producing a first control flag as a command of increasing or decreasing said magnitude of primary flux vector based on said primary flux deviation and a second control flag as a command of increasing, decreasing or retaining said instantaneous torque value based on said torque deviation;

voltage vector generation means for producing a voltage vector to be delivered to said inverter based on a phase angle and control flag; and control flag altering means for altering, on each expiration of a prescribed time length, said control flag by a time length shorter than said prescribed time length.

10. An inverter control system according to claim 9 further including voltage modifying means for modifying said primary voltage in accordance with one of a duty ratio of said pulse or said time of alteration of a control flag to a different value.

11. An inverter control system according to claim 10, wherein said control flag generation means includes polarity manipulating means for manipulating a polarity of said deviations in accordance with one of said torque command value and said torque deviation.

12. An inverter control system according to claim 10 further including control means for restricting switching of a voltage vector by said voltage vector control means during a prescribed period.

13. An inverter control system for operating a multi-phase induction motor through an inverter by controlling primary magnetic flux generated on a stator of said motor and output torque of said motor in accordance with a primary flux command value and a torque command value at a prescribed switching frequency, said system comprising:

flux vector calculation means for calculating a primary flux vector from a primary voltage applied to said motor and primary current flowing through said motor;

torque calculation means for calculating an instantaneous torque value from said primary flux vector and said primary current;

primary flux deviation calculation means for calculating a primary flux deviation of said primary flux vector from said primary flux command value;

torque deviation calculation means for calculating a torque deviation of said instantaneous torque value from said torque command value;

phase angle calculation means for calculating a phase angle of said primary flux vector;

voltage vector generation means for producing a voltage vector to be delivered to said inverter based on said primary flux deviation, torque deviation and said phase angle; and voltage vector altering means connected between said voltage vector generation means and said inverter for changing said voltage vector at a frequency shorter than said switching frequency.

14. An inverter control system according to claim 13, said voltage vector altering means comprising:

first flag generation means for generating a first flag based on one of said deviations;

second flag generation means for generating a second flag based on the other of said deviations; and means for altering said voltage vector based on said first and second flags.

15. An inverter control system according to claim 14, said means for altering comprising means for modifying one of said first and second flags.

16. An inverter control system according to claim 15, wherein:

said first flag generation means is for generating a primary flux flag as said first flag based on said primary flux deviation;

said second flag generation means is for generating a torque flag as said second flag based on said torque deviation; and said means for altering is for altering said torque flag.

17. An inverter control system according to claim 16, wherein said means for altering includes means for adding a pulse having a prescribed period and pulse width to said torque flag.

18. An inverter control system according to claim 14, where each of said first and second flag generating means includes a hysteresis comparator.

19. An inverter control system according to claim 18, where at least one of said hysteresis comparators is a three-value comparator.

* * * * *